Patented July 4, 1944

2,353,081

UNITED STATES PATENT OFFICE 2,353,081

SULPHATED MONOETHANOLAMIDES AND PROCESS FOR THE PREPARATION THEREOF

Edwin A. Robinson, Chatham, and Gifford D. Davis, South Orange, N. J., assignors to National Oil Products Company, Harrison, N. J., a corporation of New Jersey No Drawing. Application June 14, 1939, Serial No. 279,118

5 Claims. (Cl. 252—153)

This invention relates to products having outstanding foaming characteristics and to preparations such as shampoos and the like manufactured therefrom.

It has long been recognized that it is highly desirable to include in shampoos and other cleansing preparations for the skin and scalp a certain amount of a substance capable of producing a relatively large amount of foam upon use in order to improve the cleansing action of the preparation employed. It is also known that cleansing preparations used on the skin should preferably have pH values substantially the same as that of the skin, i. e., about 5.5, since alkaline materials such as ordinary soap having pH values of 8 or above tend to cause undesirable skin irritation. While a large number of shampoos and other cleansing preparations for the skin and scalp have been prepared, a considerable proportion of them are unsatisfactory in that they do not have pH values substantially the same as that of the skin and scalp or they do not produce a suitable amount of foam upon use.

U. S. Patent 1,981,792 describes the preparation of sulphated monoethanolamides of the coconut fatty acids and indicates that these amides are suitable for use as wetting, dispersing and emulsifying agents. We have carefully tested these amides and have found that while they may be used to some slight advantage in the preparation of shampoos and the like, the amount of foam produced by these compounds is not as great as desired; therefore, effective shampoos and other cleansing preparations for the skin and scalp cannot be prepared from these amides. Furthermore, experiments with these compounds have indicated that shampoo preparations made therefrom tend to leave a film upon the hair which is very difficult to rinse therefrom; this feature is highly undesirable since shampoos and the like should be completely washed from the hair after use in order to promote growth of the hair and to leave the scalp in a healthy condition.

It is the object of this invention to provide new products having pH values substantially the same as that of the skin and scalp and from which may be prepared shampoos and other cleansing agents for the skin and scalp, which, upon use, give abundant and stable foam.

It is a further object of this invention to prepare shampoos and other cleansing agents for the skin and scalp which have pH values substantially the same as that of the skin and which may be washed from the hair without leaving a film thereon.

We have found that sulphated alkylolamides of mixtures of fatty acids having from 6 to 10 carbon atoms, said mixtures containing at least 25% of a fatty acid having 8 carbon atoms, are highly effective cleansing agents and possess excellent foaming capacities. These amides preferably have pH values substantially the same or only slightly higher than that of the skin. They may be dissolved to form dilute aqueous solutions thereof whereby excellent shampoos are obtained. They may be blended with substantial quantities of a large number of other substances, such as oils, waxes, greases, sulphonated oils, amides and the like, to produce materials having excellent foaming characteristics and possessing additional desirable properties imparted to them by the particular substance blended with the amides of our invention. They may also be employed in a wide variety of other manners for the preparation of shampoos and other skin and scalp cleansing agents, as will appear from the detailed description hereinafter set forth.

The amides of our invention may be prepared by reacting an alkylolamine with a mixture of fatty acids having from 6 to 10 carbon atoms and containing at least 25% of a fatty acid having 8 carbon atoms, and then sulphating the resulting product. Preferably, the fatty acid mixture used in accordance with our invention contains caproic, caprylic and capric acids, at least 25%, and preferably between about 30% and about 55%, of the mixture being caprylic acid. The relative proportions of the fatty acids contained in the mixture may vary widely; thus, for example, mixtures of fatty acids containing from about 5% to about 10% caproic acid, from about 25% to about 55% caprylic acid and from about 35% to about 65% capric acid may be employed. It is highly important that a mixture of fatty acids such as described above be used in the practice of our invention, since we have found that the individual fatty acids forming the mixture do not yield sulphated alkylolamides having desirable foaming characteristics.

The amine which may be employed to react with the fatty acid mixture may be any alkylolamine, but we prefer to use monoethanolamine since it is relatively inexpensive and easily obtainable, and since products prepared from this amine by the practice of our invention may be used to particular advantage in the preparation of shampoos and the like. However, it is to be understood that other alkylolamines, such as diethanolamine, mono and dipropanolamines and mono and dibutanolamines may be employed. We have found that when using the higher alkylolamines, i. e., those containing more than 2 carbon atoms, in accordance with our invention, it is desirable to employ a fatty acid mixture containing a relatively high proportion of fatty acids having from 6 to 8 carbon atoms and a relatively low proportion of fatty acids having 9 and 10 carbon atoms.

The reaction of the alkylolamine with the fatty acid mixture may be accomplished in any desirable manner. Preferably, however, approximately equimolecular amounts of the amine and the fatty acid mixture are mixed and then reacted at a temperature between about 100° C. and about 180° C., preferably between about 120° C. and 135° C., for about 6 to about 15 hours, or until tests indicate the reaction mixture contains less than 2% of the unreacted amine.

The alkylolamides produced as above described may then be treated with a sulphating agent to produce the sulphated amides of our invention. The sulphation may be carried out by any of the several methods known to the art. We prefer to employ oleum containing between about 20% and about 25% $SO_3$ as the sulphating agent, but other sulphating agents such as, for example, concentrated sulphuric acid and chlorsulphonic acid may also be employed. The reaction is most advantageously carried out by introducing about 100 parts of the amide in molten condition into between about 50 and about 150 parts, preferably about 100 parts, of oleum chilled to a temperature of about 5° C., and then maintaining the mixture at temperatures between about 30° C. and about 80° C., preferably at about 50° C., for from ½ to 3½ hours, the time depending somewhat upon the particular reactants and somewhat upon the temperature. At the completion of the reaction, the acid mass may be neutralized. The neutralization may be accomplished in a variety of manners; for example, the acid mass may be dropped into an aqueous alkaline solution or ice and water may be first added to the mass in order to cool and dilute it, and alkali then introduced to effect the neutralization. Preferably, however, the acid mass is neutralized to a pH value between about 5.5 and about 6.0 by introducing the mass gradually into an alkaline solution containing ice so as to effect the neutralization at temperatures between about 20° and 45° C., preferably at a temperature below 25° C. We prefer to employ a solution of sodium hydroxide to neutralize the acid mass, but other alkaline solutions, such as, for example, sodium carbonate and potassium hydroxide solutions may be used. Alcohol may be added to the solution, if desired, in order to avoid precipitation of fatty materials at the relatively low neutralization temperatures. The neutralized mass is permitted to settle and the water layer containing salts formed upon neutralization is withdrawn.

The sulphated amides obtained as above described may contain between about 60% and about 65% water and about 15% of an alkali sulphate; their pH values are preferably between about 5.5 and about 6.0. While shampoos, soaps and the like prepared from such amides display highly effective cleansing action and develop abundant foam upon use, we prefer to remove a substantial proportion of the alkali sulphate from these amides before preparing shampoos and soaps therefrom. This removal may be effected by contacting the sulphated amides with solvents, such as isopropyl alcohol, trichlorethylene and ethylene dichloride, whereby substantially all of the alkali sulphate and a substantial proportion of the water separate and are removed. The salt-free amides may then be diluted with water so as to form aqueous solutions containing about 30% sulphated amide, which solutions are found to be highly suitable for use as shampoos. Such solutions of the sulphated amides of our invention produce much greater amounts of foam upon use than similar solutions of the sulphated monoethanolamides of coconut fatty acids and also effectively cleanse the skin and scalp; hence these solutions form highly satisfactory shampoos and represent a distinct improvement in this regard over shampoos prepared from the sulphated monoethanolamides of the coconut fatty acids. The amides of our invention may also be used in solid form for the preparation of soaps, which likewise are effective cleansing agents and develop a large amount of foam upon use.

Substantially anhydrous and inorganic salt-free sulphated alkylolamides suitable for the preparation of shampoos and the like in accordance with our invention may also be prepared as described in the copending applications of Steik, Serial No. 77,761 and Steik and Kapp, Serial No. 160,270, by sulphating an alkylolamide as above described, taking up the sulphation mass in an anhydrous solvent selected from the group consisting of alcohols, hydrocarbons, chlorinated hydrocarbons, ethers, ketones or mixtures of such solvents, treating the solution of the sulphation mass with a solution of a base, separating the salts and the unreacted sulphating agent, and distilling off the solvent and water. Such anhydrous and inorganic salt-free sulphated alkylolamides may also be prepared as described in the copending application of Kapp et al., Serial No. 197,858, by treating an alkylolamide with a sulphating agent, subjecting the sulphation mass to the usual steps of washing, neutralizing, panning, etc., then dehydrating the mass at a relatively low temperature and at a reduced pressure, taking up the partially dehydrated product in an anhydrous organic solvent, whereby the inorganic salts are precipitated, and distilling off the solvent and water. However, for the purposes of our invention, the process previously described hereinabove is preferred.

The amides of our invention may be mixed with a large number of skin and scalp emollients, such as sulphonated oils, mineral oils, other sulphated amides, unsulphated amides, degraded glycerides, blown oils, hydrogenated oils, soaps and a large number of other materials. We have found that the presence of relatively small amounts, e. g., 20%, of the sulphated alkylolamides of our invention in such mixtures imparts to these mixtures excellent foaming characteristics so that preparations possessing the particular desirable properties of the substances mixed with the sulphated amides may be manufactured, which preparations have the additional property of foaming when used on the skin and scalp. Thus, for example, we have found that compositions containing approximately 25% to 50% of a white mineral oil having a specific gravity at 15° C. of between about 0.83 and about 0.89 blended with one of the sulphated amides of our invention from which the alkali sulphate and water have been substantially completely removed, as above described, are highly effective foaming shampoos. Such products when used as shampoos develop a large amount of foam which does not break even after relatively long standing and do not irritate the scalp, because of their relatively low pH value; furthermore, the high oil content of such products causes the hair to have a smooth, pleasant feel and an attractive sheen after use. These shampoos may be easily rinsed from the hair without leaving any undesirable film thereon. It will be seen, therefore, that the amides of our invention possess the outstanding features of permitting the production of oil shampoos which form an abundant amount of stable foam upon use.

The sulphated alkylolamides of our invention may also be compounded with cosmetic greases and fats, such as wool grease, blown wool grease and lanolin, in order to effect the production of pasty shampoos or soaps. These products develop abundant foam upon use which remains stable for long periods of time; furthermore, these preparations may be used several times a day without causing any skin irritation. It is well known that most soaps if used several times a day irritate the skin of some people, causing rough hands, chapped skin, flaking of the skin and similar troubles; this skin irritation is believed to be due to the fact that ordinary soaps when used raise the pH value of the skin and in some cases the proper pH value is not quickly restored, thus inducing irritation. Such skin irritation is avoided by using soaps prepared as above indicated from the alkylolamides of our invention; this property of these soaps is apparently due to the fact that the preferred amides of our invention have pH values substantially the same or only slightly higher than that of the skin.

Shampoo products having highly desirable characteristics may also be obtained by sulphating mixtures containing an alkylolamide prepared in accordance with our invention and between about 25% and about 50% of a white mineral oil having a specific gravity of between about 0.83 and about 0.89 or a fat such as tallow. These products have pH values substantially the same as that of the skin and develop abundant foam upon use.

We have found that the presence of relatively small amounts of sulphated or unsulphated alkylolamides of oleic acid, castor fatty acids or hydrogenated castor fatty acids has a beneficial affect upon the shampoos prepared in accordance with our invention, since any drying out of the scalp caused by the use of these shampoos is thereby greatly diminished. Thus, for example, a mixture formed by sulphating approximately 85 parts of one of the amides of our invention with about 15 parts of oleic acid monoethanolamide may be used to great advantage in the preparation of shampoos as hereinabove described. We have also found that substantially the same effect may be obtained by incorporating a similar amount of the unsulphated monoethanolamides of oleic acid, castor fatty acids or hydrogenated castor fatty acids in the shampoo preparations of our invention.

The following examples are illustrative of our invention. Amounts are given in parts by weight.

Example I 61 parts of monoethanolamine and 155 parts of a mixture of fatty acids containing about 5% caproic acid, 50% caprylic acid and 45% capric acid were heated at temperatures between about 120° C. and 135° C. for about 15 hours. The amide thus formed was then melted and added to about 200 parts of 20% oleum chilled to a temperature of about 5° C. The materials after mixing were maintained at a temperature of about 50° C. for about ½ hour with agitation. The acid mass was then gradually added to approximately 400 parts of a 50% sodium hydroxide solution containing about 700 parts of ice, the temperature being maintained below 25° C. When neutralization was complete the pH value of the product was adjusted to about 6.0 with soda. The resulting mass contained about 60% water and 15% sodium sulphate; it was agitated with 600 parts of isopropyl alcohol whereby substantially all of the sodium sulphate and a large portion of the water separated and were withdrawn. The extracted mass was then diluted with water so as to form a 30% aqueous solution thereof, whereby a product was obtained which was used as a shampoo with excellent results.

Example II 50 parts of the sulphated monoethanolamide containing substantially no sodium sulphate and about 20% water prepared as described in Example I were mixed with about 50 parts of white mineral oil having a specific gravity at 15° C. ranging from 0.845 to 0.850. The resulting product was a fluid paste and an excellent shampoo.

Example III 67 parts of a mixture of fatty acids containing about 5% caproic acid, 35% caprylic acid and 60% capric acid and 26 parts of monoethanolamine were heated at temperatures between 120° C. and 135° C. for 10 hours. The amide thus produced was mixed with 15 parts of oleic acid monoethanolamide, the mixture melted and added to 100 parts of 20% oleum chilled to a temperature of 5° C. The materials after mixing were maintained at a temperature of 50° C. for about ½ hour with agitation. The acid mass was then gradually added to approximately 200 parts of a 50% sodium hydroxide solution containing 350 parts of ice, the temperature being maintained below 25° C. When neutralization was complete the pH value of the product was adjusted to about 6.0 with soda. The product was then agitated with 300 parts of isopropyl alcohol whereupon substantially all of the sodium sulphate and a large portion of the water separated and was withdrawn. The salt-free sulphated amide thus obtained was diluted so as to form a 30% aqueous solution thereof, whereby a product was obtained which was used as a shampoo with excellent results; this product, in several tests, did not cause any noticeable drying of the scalp after rinsing.

Example IV 50 parts of the monoethanolamide prepared as described in Example III and 50 parts of mineral oil having a specific gravity at 15° C., ranging from 0.845 and 0.850, were mixed and the mixture melted and added to 100 parts of 20% oleum chilled to 5° C. The materials after mixing were maintained at a temperature of about 50° C. for about ½ hour with agitation. The acid mass was then gradually added to 200 parts of a 50% sodium hydroxide containing about 350 parts of ice, the temperature being maintained below 25° C. The water layer was withdrawn and the pH value of the amide adjusted to about 6.0 with soda. This product was used with excellent results as a shampoo.

Example V 85 parts of the salt-free sulphated amide prepared as described in Example III were mixed with about 15 parts of a mixture containing approximately equal proportions of lanolin and wool grease. The resulting product was a paste and had a pH value of about 6.0. When used as a soap it cleansed the hands well, left a desirable feel and could be used several times daily without irritating the skin in any way.

From the above description it will be evident that the amides of our invention possess highly desirable characteristics as foaming and cleansing agents and that they are particularly suitable for use in the preparation of shampoos, soaps and other cleansing agents for the skin and scalp. Their low pH values render them particularly adaptable for this purpose since irritation of even the most sensitive skin is avoided. Since they may be blended with large quantities of oils, greases and the like, products having a wide variety of desirable properties may thereby be obtained. The excellent foaming capacities of these amides not only permit their use in the manufacture of skin and scalp cleansing agents, but also enable these products to be used whenever the production of foam is desirable. Thus, for example, we have found that the addition of small amounts of the amides of our invention to trisodium phosphate effectively inhibits the undesirable defoaming characteristics of this salt. The amides of our invention are also highly effective wetting agents, being superior in this respect to the sulfated monoethanolamides of the coconut fatty acids. In view of the above, it will be apparent that the amides of our invention will be of great interest to those skilled in the art.

It is to be understood that the term "sulphated" used throughout the specification and claims is intended to denote not only neutralized sulphuric acid esters of the alkylolamides, but also the unneutralized esters.

Since certain changes may be made in the above compositions of matter and different embodiments of the invention could be made without departing from its scope, it is intended that all matter contained in the above description shall be interpreted as illustrative and not in a limiting sense.

Having described our invention, what we claim as new and desire to secure by Letters Patent, is:

1. Sulphated monoethanolamides of mixtures of caproic, caprylic and capric acids, said mixtures containing from about 5% to about 10% caproic acid, from about 25% to about 55% caprylic acid and from about 35% to about 65% capric acid.

2. Sulphated monoethanolamides of mixtures of caproic, caprylic and capric acids, said mixtures containing about 50% caprylic acid.

3. The sulphated monoethanolamide of a mixture of caproic, caprylic and capric acids, said mixture containing about 5% caproic acid, about 35% caprylic acid and about 60% capric acid.

4. A shampoo comprising a sulphated monoethanolamide of a mixture of caproic, caprylic and capric acids, said mixture containing from about 5% to about 10% caproic acid, from about 25% to about 55% caprylic acid and from about 35% to about 65% capric acid, and a substantially white mineral oil having a specific gravity at 15° C. of between about 0.83 and about 0.89.

5. A process for the preparation of substances having excellent foaming capacities particularly adaptable for use in the preparation of shampoos, soaps and the like, which comprises reacting at temperatures between about 100° C. and about 180° C., monoethanolamine with a mixture of caproic, caprylic and capric acids, said mixture containing from about 5% to about 10% caproic acid, from about 25% to about 55% caprylic acid, and from about 35% to about 65% capric acid, melting the resulting product, adding the molten mass gradually to a sulphating agent selected from the group consisting of concentrated sulphuric acid, oleum and chlorsulphonic acid maintained at a relatively low temperature, agitating the mixture at a temperature between about 30° C. and about 80° C. for between about ½ and about 3½ hours, then neutralizing the acid mass with an alkali at a temperature below about 25° C., recovering the neutralized mass and removing the alkali sulphates and a substantial portion of the water from the neutralized mass.

EDWIN A. ROBINSON.
GIFFORD D. DAVIS.